Patented Jan. 3, 1933

1,892,878

UNITED STATES PATENT OFFICE

GEORGE HOLLAND ELLIS, OF SPONDON, NEAR DERBY, ENGLAND, ASSIGNOR TO CELANESE CORPORATION OF AMERICA, A CORPORATION OF DELAWARE

PRODUCTION OF BLACK COLORATIONS ON MIXED MATERIALS CONTAINING ORGANIC DERIVATIVES OF CELLULOSE

No Drawing. Application filed December 21, 1928, Serial No. 327,758, and in Great Britain January 7, 1928.

This invention relates to the production of uniform black colorations on mixed materials containing cellulose acetate or other organic acid esters of cellulose, for example cellulose formate, propionate or butyrate or the products obtained by the treatment of alkalized cellulose with esterifying agents (e. g. the product known as "immunized cotton" obtained with p-toluene sulpho-chloride), or containing cellulose ethers, for instance methyl, ethyl or benzyl cellulose or the corresponding condensation products of cellulose and glycols or other polyhydric alcohols. All such cellulose derivatives are hereinafter referred to as organic substitution derivatives of cellulose.

The process of the present invention aims more particularly at producing uniform blacks on mixed materials comprising cellulose acetate or other organic substitution derivative of cellulose and cotton, linen, regenerated cellulose artificial silks or rayons, or other cellulosic fibres. It is however of considerable use in the production of uniform blacks on mixed materials comprising cellulose esters or ethers and animal fibres, for example natural silk.

Considerable difficulties have been encountered in the production of uniform blacks on such mixed materials, since in general the conditions necessary for the production of the best blacks on the cellulose derivatives on the one hand and on the cellulosic or animal fibres on the other hand are by no means identical.

According to the present invention fast uniform blacks are obtained on mixed materials containing cellulose acetate or other organic substitution derivatives of cellulose by the oxidation on the materials of a mixture consisting of para-aminodiphenylamine and aniline, for example a mixture of equal parts by weight of each.

The amines are advantageously made acid prior to their application by means of suitable acids, preferably organic, for instance lactic acid or acetic acid. Furthermore, absorption of the amines by the cellulose ester or ether component may be promoted by means of alcohol or other substance having a swelling action thereon.

In preparing the mixture for application to the goods, the para-aminodiphenylamine may be dissolved in aniline oil with slight warming, the proportions being for example 1 part by weight of each, the mixture made acid by addition of lactic and/or acetic acid or other suitable acid and alcohol or the like added.

With the oxidizing agent, for example a chlorate, one or more catalysts or oxygen carriers, for instance salts of vanadium, copper or chromium, are preferably used. There may also be added aluminium chloride or other inorganic salts known in the production of oxidation blacks on cotton or the like.

The amine mixture may, for example, be applied to the goods by impregnation in a liquor trough fitted with squeezing rollers or by printing methods. Substantive absorption of the amine mixture from aqueous solutions or dispersions is obviously not suitable for the purpose of the present invention, since the affinities of the different fibres in the mixed materials are widely different and uniform blacks could not therefore be obtained with this method of application.

In the preferred method of carrying out the invention, the amine mixture and oxidizing agent or mixture are applied together and for this purpose they should be mixed just before use. The mixture may be thickened by addition of a small quantity of a suitable agent such as gum arabic or starch. For application by printing methods larger quantities of thickeners may be employed. After application of the mixture the goods may be dried, aged and, if desired, an after-chroming treatment applied, and a final soaping.

The following example illustrates the process of the invention, but is not to be considered as limiting it in any way:—

Example

Dissolve 5 parts of para-aminodiphenylamine in 5 parts of aniline oil by slight warming.

Prepare the following liquors:—

Liquor A.
- 10 parts p-aminodiphenylamine aniline oil prepared as above
- 10 parts lactic acid 50%
- 30 parts acetic acid 50%
- 20 parts methylated spirit
- 30 parts water

100

Liquor B.
- 5 parts aluminium chloride 52° Tw.
- 5 parts chromium chloride 52° Tw.
- 0.4 parts cupric chloride, crystals
- 6.0 parts sodium chlorate, crystals
- 53.6 parts water
- 30 parts gum arabic (1:1)

100

Mix liquors A and B just before use and strain. Place the mixed liquor in the impregnating trough or machine and mechanically impregnate the goods, for example a woven fabric having a warp of cotton and a weft of cellulose acetate threads; dry and age for about five minutes with moist steam at 100° C.; soap with soft water containing 2.5 grams of soap per litre at 80° C. for about 15 minutes or as long as necessary to give the required degree of fastness against rubbing, and finish as desired.

If desired an afterchroming may be applied by treating for ½ hour at 60° C. in a liquor containing 0.25 grams of bichromate per litre.

What I claim and desire to secure by Letters Patent is:—

1. The production of uniform black colorations on mixed materials containing organic substitution derivatives of cellulose and cotton which comprises oxidizing on the materials a mixture containing para-aminodiphenylamine and aniline as the sole oxidizable constituents for imparting color.

2. The production of uniform black colorations on mixed materials containing cellulose acetate and cotton which comprises oxidizing on the materials a mixture containing para-aminodiphenylamine and aniline as the sole oxidizable constituents for imparting color.

3. The production of uniform black colorations on mixed materials containing cellulose acetate and cotton which comprises impregnating the goods with a mixture containing para-aminodiphenylamine and aniline as the sole oxidizable constituents for imparting color, an oxidizing agent and a catalyst and drying and ageing.

4. The production of uniform black colorations on mixed materials containing cellulose acetate and cotton which comprises impregnating the goods with a mixture containing para-aminodiphenylamine and aniline as the sole oxidizable constituents for imparting color, a swelling agent for the cellulose acetate, an oxidizing agent and a catalyst and drying and ageing.

5. The production of uniform black colorations on mixed materials containing cellulose acetate and cotton which comprises impregnating the goods with a mixture containing para-aminodiphenylamine and aniline as the sole oxidizable constituents for imparting color, an acid and an oxidizing agent and drying and ageing.

6. The production of uniform black colorations on mixed materials containing cellulose acetate and cotton which comprises impregnating the materials with a mixture containing as the sole oxidizable constituents for imparting color para-aminodiphenylamine and aniline and also containing oxidizing agents, and then drying and ageing.

In testimony whereof I have hereunto subscribed my name.

GEORGE HOLLAND ELLIS.